United States Patent
Rouquette-Leveil et al.

(10) Patent No.: US 8,787,479 B2
(45) Date of Patent: Jul. 22, 2014

(54) SPATIAL MAPPING OF AN OFDM SIGNAL TO REDUCE ATTENUATION FROM AN INDIVIDUAL TRANSMIT ANTENNA IN A MIMO TRANSMITTER

(75) Inventors: Stephanie Rouquette-Leveil, Massy (FR); Marc Bernard De Courville, Paris (FR)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 12/935,810

(22) PCT Filed: Mar. 19, 2009

(86) PCT No.: PCT/US2009/037613
§ 371 (c)(1),
(2), (4) Date: Sep. 30, 2010

(87) PCT Pub. No.: WO2009/123861
PCT Pub. Date: Oct. 8, 2009

(65) Prior Publication Data
US 2011/0026639 A1    Feb. 3, 2011

(30) Foreign Application Priority Data

Mar. 31, 2008 (EP) .................................. 08290318

(51) Int. Cl.
*H04B 7/02* (2006.01)
(52) U.S. Cl.
USPC ........... 375/267; 375/260; 375/299; 375/347; 455/13.3; 455/101
(58) Field of Classification Search
None
See application file for complete search history.

(56) References Cited

U.S. PATENT DOCUMENTS

| | | | |
|---|---|---|---|
| 2003/0072254 A1* | 4/2003 | Ma et al. | 370/208 |
| 2005/0204273 A1 | 9/2005 | Jeong et al. | |
| 2007/0140371 A1 | 6/2007 | Horng et al. | |
| 2007/0211822 A1* | 9/2007 | Olesen et al. | 375/299 |

FOREIGN PATENT DOCUMENTS

WO    2006064469    6/2006

OTHER PUBLICATIONS

Office Action, Korean App. No. 1-2010-7024383 (Foreign Text and English Translation), Oct. 26, 2011.
Mohajerani P. et al: "Frequency-dependent space-interleacing for MIMO OFDM Systems" Radio and Wireless Conference, 2003. Rawcon '03. Proceedings Aug. 10-13, 2003, Piscataway, NJ, USA, IEEE, Aug. 10, 2003, pp. 79-82. XP010656702.
Huwaei Technologies: "Improved STBC-SM Transmission Scheme" Jun. 3, 2007, XP002502991. Retrieved from the Internet: URL https://mentor.ieee.org/802.11/file/07/11-07-0292-00-000n-improved-stbc-sm.doc.
European Search Report for EP 08290318, Issued on Nov. 20, 2008.
PCT International Search Report and Written Opinion for PCT/US09/37613, Issued on May 20, 2009.

* cited by examiner

*Primary Examiner* — Adolf Dsouza

(57) ABSTRACT

A method is provided for transmitting a digital signal. The method includes generating a plurality of spatial streams from a digital signal and transforming the spatial streams into a plurality of space-time streams. Each of the space-time streams are cycled in the frequency domain among each of a plurality of transmit antennas. The space-time streams are wirelessly transmitted from the plurality of transmit antennas.

21 Claims, 3 Drawing Sheets

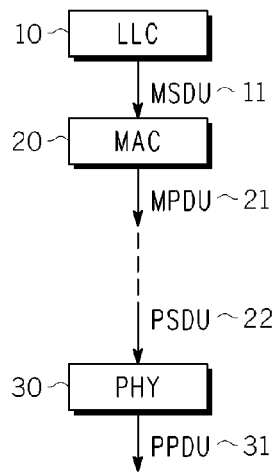
FIG. 1
-PRIOR ART-
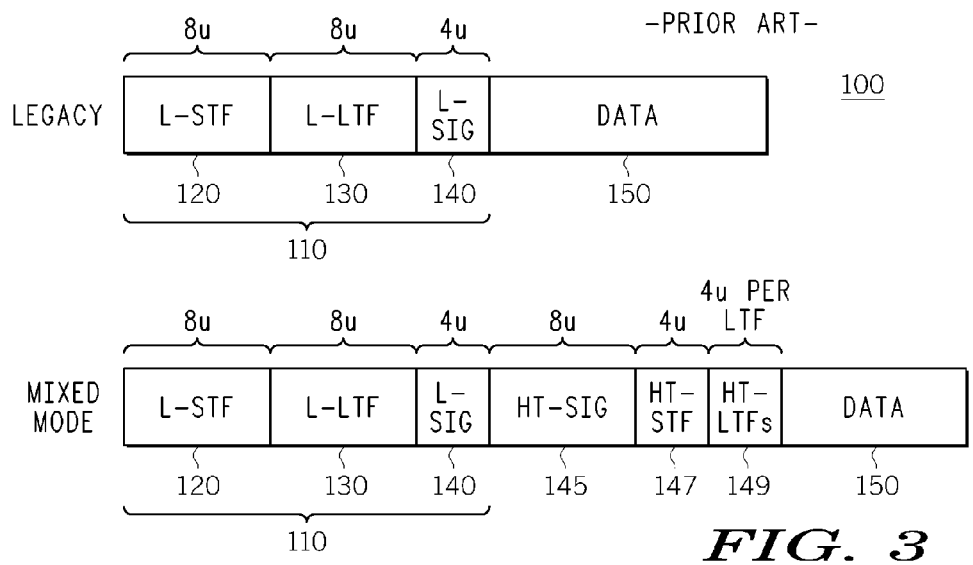
FIG. 2
-PRIOR ART-
FIG. 3
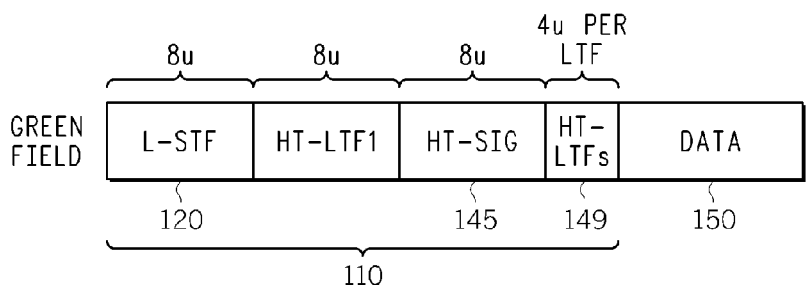
FIG. 4

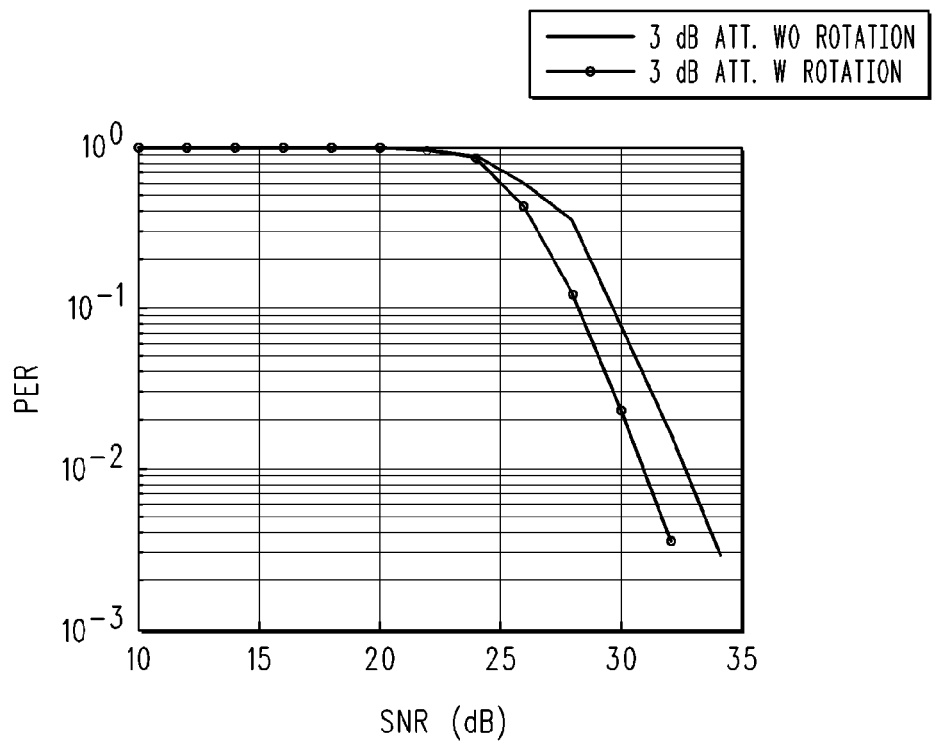
FIG. 6
FIG. 7
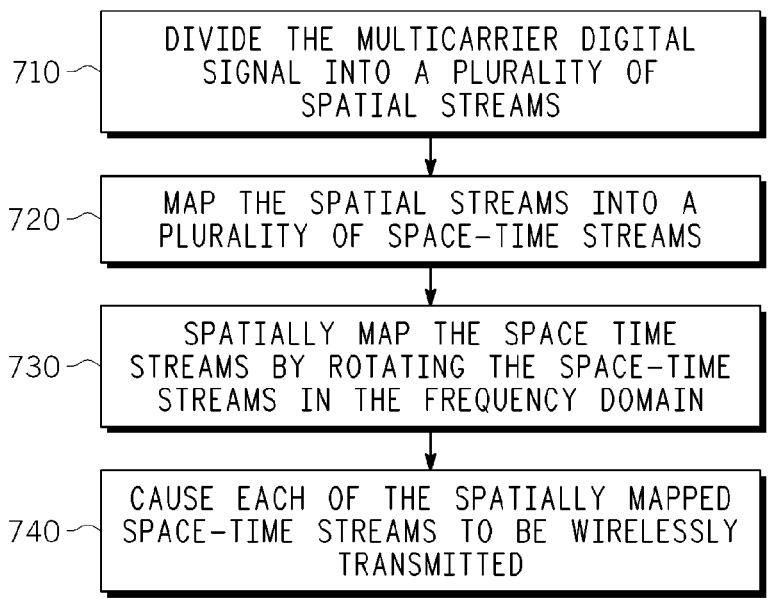

SPATIAL MAPPING OF AN OFDM SIGNAL TO REDUCE ATTENUATION FROM AN INDIVIDUAL TRANSMIT ANTENNA IN A MIMO TRANSMITTER

FIELD OF THE INVENTION

The invention relates generally to multicarrier modulation techniques, and more particularly to a spatial mapping operation for OFDM signals employed in an IEEE 802.11n communication system.

BACKGROUND OF THE INVENTION

In recent years, wireless data communication in domestic and enterprise environments have become increasingly commonplace and an increasing number of wireless communication systems have been designed and deployed. In particular, the use of wireless networking has become prevalent and wireless network standards such as IEEE 801.11a and IEEE 801.11 g have become commonplace.

The requirement for increasing data rates, communication capacity and quality of services has led to continued research and new techniques and standards being developed for wireless networking. One such standard is the IEEE 801.11n standard which is currently under development. IEEE 801.11n is expected to operate in the 2.4 GHz or 5 GHz frequency spectrum and promises data rates of around 100 Mbps and above on top of the MAC layer. IEEE 801.11n will use many techniques which are similar to the earlier developed IEEE 801.11a and IEEE 801.11g standards. The standard is to a large extent compatible with many of the characteristics of the earlier standards thereby allowing reuse of techniques and circuitry developed for these. For example, as in the previous standards IEEE 801.11a and IEEE 801.11g, IEEE 801.11n will use Orthogonal Frequency Division Multiplex (OFDM) modulation for transmission over the air interface.

The frame or packet formats employed by the IEEE 801.11 a/g/n standards can be understood with reference to the open system interconnection (OSI) model, which defines the application, presentation, session, transport, network, data link, and physical layers. The data link layer includes a logical link control (LLC) layer and a media access control layer. The MAC layer controls how to gain access to the network, and the LLC layer controls frame synchronization, flow control and error checking. The physical layer (PHY) transmits signals over the network. FIG. 1 shows the LLC, MAC and PHY layers along with the IEEE 801.11 a/g/n frames with which they are associated. As shown, each MAC service data unit (MSDU) or frame 11, received from a logic link control layer (LLC) 10, is appended with a MAC header and a frame check sequence (FCS) trailer, at the MAC layer 20, to form a MAC layer protocol data unit (MPDU) or frame 21. At the physical layer, the MPDU is received as a physical layer service data unit (PSDU) or frame 22. At the physical layer 30, a physical layer convergence procedure (PLCP) header, a PLCP preamble, and tail and pad bits are attached to the PSDU frame 22 to form a physical layer protocol data unit (PPDU) or frame 31 for transmission on the channel.

In order to improve efficiency and to achieve the high data rates, IEEE 801.11n is planned to introduce a number of advanced techniques. For example, IEEE 801.11n communication is expected to be typically based on a plurality of transmit and receive antennas. Furthermore, rather than merely providing diversity from spatially separated transmit antennas, IEEE 801.11n will utilise transmitters having at least partially separate transmit circuitry for each antenna thus allowing different sub-signals to be transmitted from each of the antennas. The receivers may receive signals from a plurality of receive antennas and may perform a joint detection taking into account the number and individual characteristics associated with each of the plurality of transmit antennas and receive antennas. Specifically, IEEE 801.11n has seen the introduction of a Multiple-Transmit-Multiple-Receive (MTMR) antenna concept which exploits Multiple-Input-Multiple-Output (MIMO) channel properties to improve performance and throughput. MIMO processing operates in conjunction with information located in a PPDU frame or packet.

One class of MTMR techniques that is specified in IEEE802.11n is spatial mapping, which is performed on a signal that has been divided into a number of different spatial streams. Spatial mapping techniques include direct mapping, cyclic shift diversity, beamforming and spatial expansion techniques. In spatial expansion, space expanded symbols are transmitted from spatially separate antennas. The spatial expansion provides separate space-time streams for each of the spatially separate antennas. More specifically, the spatial expansion or coding includes encoding a stream of symbols to provide separate encoded streams for separate antennas. Each encoded stream is distinct. For example, differential delays can be imposed upon different space-time streams by imposing different phase rotations on the samples of each of the streams.

Problems can arise with conventional spatial mapping techniques because each transmit antenna is provided with a separate, fixed one of the streams. For instance, if the stream transmitted from one of the antennas is sufficiently attenuated at the receiver so that packets in that stream are lost, there is no opportunity for the receiver to recover those packets from other transmit antennas. This situation may occur when the receiver, situated in a computer, personal digital assistant (PDA), router, base station, set top box, cellular telephone or the like, is subject to interference from nearby objects. This problem can be particularly acute for a receiver situated in a set top terminal, which is generally fixed in location and often surrounded by other equipment that can cause the stream from one or more of the antennas to be significantly attenuated.

One way to overcome this problem involves cycling the streams among the various antennas so that even if part of a packet in a particular stream is not successfully received from one transmit antenna, the other parts of this packet can be received from another one of the transmit antennas. Such a scheme has been proposed in "Improved STBC-SM Transmission Scheme", Huawei Technologies, IEEE 802.11-07/0292r0, March 2007. In this scheme, each stream is sequentially sent to the different transmit antennas. Mathematically, this is accomplished by applying a temporal rotation to the different spatial streams. Unfortunately, this scheme imposes significant additional burdens on the receiver, substantially increasing its complexity and cost. In particular, since the mapping of the spatial streams onto the transmit antennas varies with time, the receiver needs to compute a new equalizer for each different permutation received from the transmit antennas. The equalizer is used to perform channel equalization on each of the subcarriers in the signal to mitigate signal distortions experienced by the streams during transmission. Since channel equalization is computationally expensive, the need to compute additional equalizers requires the receiver to perform additional computationally intensive tasks. For instance, if three transmit antennas are employed, the number of equalizers that need to be computed increases by a factor of 3 for each subcarrier in the stream.

Accordingly, it would be desirable to provide a method and apparatus for transmitting a wireless signal from a MIMO transmitter that can avoid the aforementioned problems without increasing the complexity of the receiver.

SUMMARY

In accordance with the present invention, a method is provided for transmitting a digital signal. The method includes generating a plurality of spatial streams from a digital signal and transforming the spatial streams into a plurality of space-time streams. Each of the space-time streams are cycled in the frequency domain among each of a plurality of transmit antennas. The space-time streams are wirelessly transmitted from the plurality of transmit antennas.

In accordance with one aspect of the invention, cycling in the frequency domain may include applying a rotation matrix to each of the space-time streams.

In accordance with another aspect of the invention, the rotation matrix may be applied by spatially mapping the space-time streams.

In accordance with another aspect of the invention, the digital signal may employ a multicarrier modulation scheme.

In accordance with another aspect of the invention, the multicarrier modulated digital signal may have a plurality of subcarriers and the space-time streams are rotated in a manner that varies from subcarrier to subcarrier.

In accordance with another aspect of the invention, the plurality of space-time streams may each include data and a preamble for estimating a channel transfer function. In addition, spatial mapping may be applied by rotating both the data and the preamble of the space-time streams.

In accordance with another aspect of the invention, a number of transmit chains is equal to 3 and rotation of the space-time streams to subcarriers k, k+1 and k+2 may be performed by applying spatial mapping matrices $Q_k$, $Q_{k+1}$, and $Q_{k+2}$, respectively, where $$Q_k = \begin{bmatrix} 1 & 0 & 0 \\ 0 & 1 & 0 \\ 0 & 0 & 1 \end{bmatrix}$$

$$Q_{k+1} = \begin{bmatrix} 0 & 0 & 1 \\ 1 & 0 & 0 \\ 0 & 1 & 0 \end{bmatrix}$$

$$Q_{k+2} = \begin{bmatrix} 1 & 0 & 0 \\ 0 & 0 & 1 \\ 0 & 1 & 0 \end{bmatrix}$$

In accordance with another aspect of the invention, the multicarrier digital signal may be an Orthogonal Frequency Division Multiplexing (OFDM) signal.

In accordance with another aspect of the invention, the OFDM signal may be compatible with at least one IEEE 802.11 standard.

In accordance with another aspect of the invention, the spatial mapping may include encoding the space-time streams using space time block coding (STBC).

In accordance with another aspect of the invention, a wireless Multiple-Input-Multiple-Output (MIMO) transmitter is provided. The MIMO transmitter includes a stream parser for generating a plurality of spatial streams from a digital signal and a space time block coder (STBC) for mapping each of the spatial streams to a plurality of space-time streams. The MIMO transmitter also includes a spatial mapper for spatially expanding each of the space-time streams by rotating the space-time streams in a frequency domain. An analog front end is provided for modulating the spatially expanded space-time streams onto a wireless carrier.

In accordance with another aspect of the invention, the analog front end may include a plurality of transmit antennas and rotation of the space-time streams in the frequency domain causes each of the space-time streams to be cycled among each of the plurality of transmit antennas.

BRIEF DESCRIPTION OF THE DRAWINGS

FIG. 1 shows the LLC, MAC and PHY layers of the OSI model, along with the IEEE 801.11 a/g/n frames with which they are associated.

FIG. 2 shows the conventional physical layer preamble in accordance with the IEEE 802.11a/g standards.

FIG. 3 shows a mixed-mode physical layer preamble in which 802.11a/g and 802.11n devices coexist.

FIG. 4 shows a green field physical layer preamble in which only 802.11n devices are operable.

FIG. 6 is a graph showing the packet error rate as a function of the signal-to-noise ratio for a signal that is received with a 3 dB attenuation from one transmit antenna both when the space-time streams are and are not rotated.

FIG. 7 is a flowchart showing one example of the pertinent steps performed by a MIMO transmitter to reduce signal degradations.

DETAILED DESCRIPTION

Figure 5:
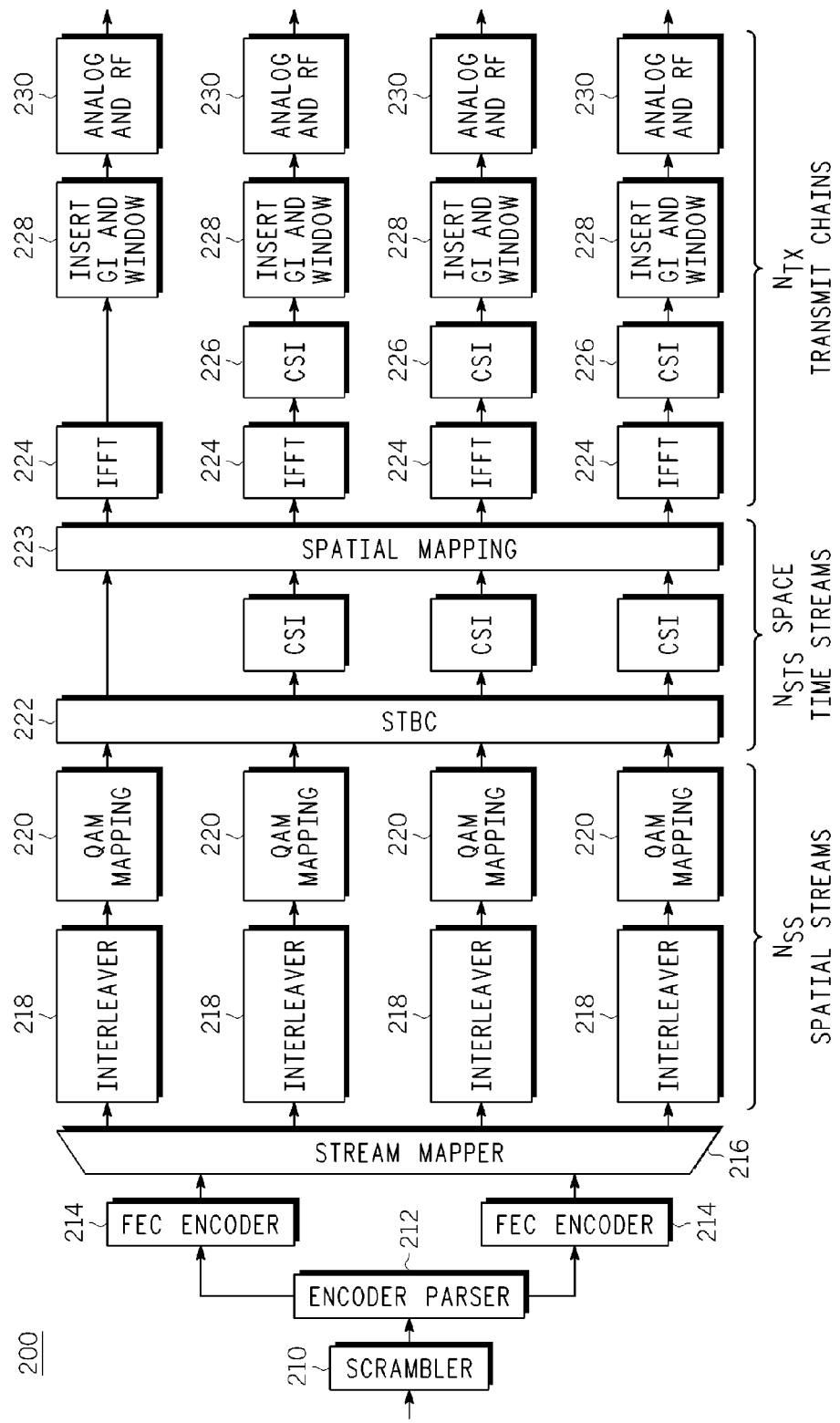
FIG. 5 shows one example of a MIMO Transmitter.

As detailed below, particular multiple antenna transmission techniques are provided for overcoming degradations to a multicarrier modulated signal being received from one or more individual antennas in a Multiple-Input-Multiple-Output (MIMO) transmitter. These multiple antenna transmission techniques advantageously facilitate the acquisition of the signal without requiring any changes in the design or operation of the MIMO receiver.

The techniques described herein can be employed on a variety of different communication methods and devices utilizing a multicarrier modulation scheme such as Orthogonal Frequency Division Multiplexing (OFDM). In general, OFDM is a block-oriented modulation scheme that maps a number of data constellation points onto a number of orthogonal carriers separated in frequency by BW/N, where BW is the bandwidth of the OFDM symbol and N is the number of tones in the OFDM symbol. OFDM is a technique by which data is transmitted at a high rate by modulating several low bit rate carriers in parallel rather than one single high bit rate carrier. OFDM is particularly useful in the context of Wireless Local Area Network (WLAN), Digital Video Broadcasting (DVB), High Definition Television (HDTV) as well as for Asymmetric Digital Subscriber Lines (ADSL) systems. OFDM can also be useful in satellite television systems, cable television, video-on-demand, interactive services, mobile communication devices, voice services and Internet services. The techniques will be described in the context of the IEEE 802.11n draft standard, which employ OFDM. These techniques relate generally to the PHY layer architecture. The following reference presents the MAC and PHY layer of IEEE 802.11n draft standard: "Wireless LAN Medium Access Control (MAC) and Physical Layer (PHY) specifications—Enhancements for Higher Throughput" IEEE P802.11n™/D2.05.

In order to enable or facilitate reception, the standards of IEEE 802.11a/g as well as the 802.11n draft standard prescribe that all data packets are preceded by a physical layer preamble which comprises known data or training symbols that facilitates receiver gain setting, synchronization and channel estimation. The physical layer preamble will be described in more detail with reference to FIG. 2, which shows a conventional frame format 100 in accordance with the IEEE 802.11a/g standards. The frame format 100 comprises a physical layer preamble or legacy header 110 and a data field 150. As previously noted, in the context of the Open Systems Interconnection (OSI) reference model, the physical layer preamble 110 is a part of the PLCP preamble that is incorporated in a PPDU packet. PPDU packets are employed in the part of the physical layer referred to as the PLCP sublayer.

The preamble 110 includes a Legacy Short Training Field (L-STF) 120 that comprises ten Legacy Short Training Symbols (L-STS). These are used to detect the presence of an incoming signal and to perform initial estimations of, for example, carrier frequency offset. Thereafter, there is a Legacy Long Training Field (L-LTF) 130 comprising two Legacy Long Training Symbols (L-LTS). These OFDM training symbols are used to perform channel estimation (i.e., an estimate of the channel transfer function from the transmitting antenna to each receiving antenna). Channel estimation is employed to determine the effects that the transmission environment has on the transmitted data signals. The channel estimation procedure utilizes the long training symbols, which have a known magnitude and phase, to compensate for signal changes due to the transmission environment. The long training symbols can be analyzed to determine the effects of the environment on the transmitted signal and this information utilized to adjust the data signals appropriately. The preamble 110 also includes a Legacy SIGNAL (L-SIG) field 140. The information in the L-SIG field 140 is needed to transmit general frame format parameters, such as packet length and data rate and the details of the modulation format that is used. The Legacy Short Preamble, Long Preamble and Signal field comprise a legacy header 110. The OFDM symbols carrying the user data are located in the DATA field 150 that follows the SIGNAL field.

FIG. 3 shows a mixed-mode frame format in which 802.11a/g and 802.11n devices coexist. Similarly, FIG. 4 shows a green field frame format in which only 802.11n devices are operable. The frame format shown in FIG. 3 includes the legacy STS, LTS and SIG fields. In addition a second SIG field, denoted the High-Throughput SIG field (HT-SIG) 145, is provided, as well as a High Throughput Short Training Field (HT-STF) 147 and a High Throughput Long Training Field (HT-LTF) 149. The HT-STF 147 is used to set the AGC and for acquisition tasks when operating in a green field mode. The HT-LTF 149, which is used to provide the receiver with some knowledge of the MIMO channel, includes two parts: Data LTFs (DLTFs) that are used to measure the channel experienced by the data and to decode the data portion of the PPDU; and Extension LTFs (ELTFs) that are used to probe additional spatial dimensions of the channel which are not utilized in the data portion of the PPDU. The number of DLTFs is denoted $N_{DLTF}$ and the number of ELTFs is denoted $N_{ELTF}$. The total number of HT-LTFs, denoted $N_{LTF}$, is $$N_{LFT}=N_{DLTF}+N_{ELTF}$$

The aforementioned 802.11n draft specification currently prescribes that $N_{LTF}$ shall not exceed 5.

FIG. 5 shows one example of a MIMO Transmitter 200. The MIMO transmitter 200 includes a scrambling block 210 for scrambling the data at the bit level to prevent long strings of zeros or ones, an encoder parsing block 212 for demultiplexing the scrambled bits among $N_{ES}$ FEC encoders, and $N_{ES}$ FEC encoding blocks 214 for encoding the data to enable error correction. A stream parsing block or stream mapper 216 divides the output from the FEC encoding blocks 214 into blocks that will be sent to different interleavers and mapping devices. The sequences of the bits sent to the interleavers are called spatial streams. The number of spatial streams is denoted NSS. Interleaver blocks 218 interleave the bits of each spatial stream to prevent long sequences of noisy bits from entering the FEC decoder. QAM mapping blocks 220 map the sequence of bits in each spatial stream to constellation points. A space time block coder (STBC) 222 maps the $N_{SS}$ spatial streams to different transmit chains by providing $N_{STS}$ space time streams. The number of transmit chains is denoted $N_{TX}$. Optionally, a spatial mapping block 223 may receive the spatial streams from the STBC 222. The spatial mapping block 223 can perform direct mapping, spatial expansion (to transmit the $N_{STS}$ streams over $N_{TX}$ antennas using an open-loop solution), space time block coding (STBC) and beam forming (to transmit the $N_{STS}$ space time streams over $N_{TX}$ antennas using some knowledge of the channel between the transmitter and the receiver). Inverse fast Fourier transform block 224 convert a block of constellation points to a time domain block. Cyclic shift insert blocks 226 insert the cyclic shift into each of the time domain blocks and guard interval insertion blocks 228 insert the guard interval into each time domain block. The guard interval insertion blocks 228 may include windowing to smooth the edges of each symbol to increase spectral decay. Finally, the symbols are forwarded to an analog front end 230 for modulating the spatially expanded space-time streams onto a wireless carrier.

The spatial mapping block 223 allows the transmission of $N_{STS}$ space-time streams on $N_{TX}$ antennas, with $N_{TX}$ greater than or equal to $N_{STS}$. The spatial mapping operation is characterized by a matrix that can vary from one subcarrier to another and that is composed of two submatrices, one characterizing the spatial mapping applied to the $1^{st}$ part of the LTFs and to the data, and the second one characterizing the spatial mapping applied to the $2^{nd}$ part of the LTFs In particular, the mapping between space time streams and transmit chains is defined by the columns of an antenna map matrix $Q_k$ for subcarrier k. The first $N_{STS}$ columns define the spatial mapping applied to the DLTFs and used for data transmission and the next $N_{ESS}$ columns (up to $N_{TX}$–$N_{STS}$ columns) define the spatial mapping applied to the ELTFs. Thus, for the purpose of defining the HT-LTFs, $Q_k$ is an $N_{TX} \times (N_{STS}+N_{ESS})$ dimension matrix. Columns 1 ... $N_{STS}$ of $Q_k$ are excited by the DLTFs and columns $N_{STS}+1$ ... $N_{STS}+N_{ESS}$ are excited by the ELTFs, where $N_{STS}+N_{ESS} \leq N_{TX}$ is the total number of spatial streams being probed by the HT-LTFs.

As previously mentioned, in the event that the signal from one antenna in a MIMO transmitter is attenuated due to interference or the like, the packet being transmitted by that antenna may be lost. To overcome this problem the space-time stream may be successively transmitted to all the antennas in the MIMO transmitter. In this way, even if part of a packet in a particular stream is not successfully received from one transmit antenna, the other parts of this packet can be received from another one of the transmit antennas. One way to ensure that the space-time streams are successively transmitted to all the antennas is to apply a rotation to the space-time streams before they are mapped to the transmit chains.

The rotation that is applied to the space-time streams may be performed as a spatial mapping by the spatial mapping block 223 of the transmitter 200. The spatial mapping is performed in the frequency domain and in most cases should generally vary from one subcarrier to the other.

One important advantage that arises from performing the rotation as a spatial mapping in the frequency domain is that spatial mapping operations are transparent to the receiver. In particular, the receiver does not need to compute a new equalizer for each subcarrier, thereby avoiding not only the need for additional computationally intensive overhead, but indeed, avoiding the need to modify the receiver in any way whatsoever. In contrast, the technique shown in the aforementioned Huawei Technologies reference, which rotates the spatial streams in the time domain, requires the receiver to compute additional equalizers, the number of which scales with the number of transmit antennas that are employed. The computation of each equalizer generally involves matrix inversion of the channel transfer matrix or functions thereof. The computational complexity of this problem can be appreciated by recognizing that the size of the matrix to be inverted is typically equal to the number of transmit antennas and the number of data and pilot subcarriers, which can vary from 52 for IEEE 802.11n systems (i.e., Wi-Fi systems) to 1536 for IEEE 802.16e systems (i.e., Wi-Max systems).

For purposes of illustration, an example will be presented for the case of a three antenna MIMO transmitter that employs a rate 2 STBC scheme, as specified in section 20.3.10.8.1 of "Wireless LAN Medium Access Control (MAC) and Physical Layer (PHY) specifications—Enhancements for Higher Throughput" IEEE P802.11n™/D2.05. The $t^{th}$ symbol $d_{i,t}$ of the spatial stream i is transmitted on one of the three antennas according to the following table:

|  | Symbol #2m | Symbol #2m + 1 |
|---|---|---|
| Antenna #1 | $d_{1,2m}$ | $d_{1,2m+1}$ |
| Antenna #2 | $-d_{1,2m+1}^*$ | $d_{1,2m}^*$ |
| Antenna #3 | $d_{2,2m}$ | $d_{2,2m+1}$ |

The antenna map matrices $Q_k$ which characterize the rotational spatial mapping operation for the subcarriers k, k+1, and k+2, where k=0, 3, 6, ... may be chosen as shown in Table 1.

TABLE 1

Example of spatial mapping matrices for stream rotation $$Q_k = \begin{bmatrix} 1 & 0 & 0 \\ 0 & 1 & 0 \\ 0 & 0 & 1 \end{bmatrix} \quad Q_{k+1} = \begin{bmatrix} 0 & 0 & 1 \\ 1 & 0 & 0 \\ 0 & 1 & 0 \end{bmatrix} \quad Q_{k+2} = \begin{bmatrix} 1 & 0 & 0 \\ 0 & 0 & 1 \\ 0 & 1 & 0 \end{bmatrix}$$

This example assumes that the third antenna, which transmits the uncoded stream when no rotation is applied, is subject to a 3 dB penalty because of the environment in which the receiver is situated (e.g., objects near the receiver attenuate the signal). Performance results are presented in FIG. 6 for 64 QAM and R=5/6. In particular, FIG. 6 is a graph showing the packet error rate as a function of the signal-to-noise ratio both when the space-time streams of the signal are and are not rotated in the manner described above. The results show that application of the rotation leads to a 1.7 dB gain. The particular value of this gain in performance is dependent on the attenuation experienced by the third antenna.

FIG. 7 is a flowchart showing one example of the pertinent steps performed by the MIMO transmitter shown in FIG. 5. The method begins in step 710 by dividing a multicarrier (e.g., an OFDM) digital signal having a plurality of subcarriers into a plurality of spatial streams. In step 720 the spatial streams are mapped into a plurality of space-time streams. The space time streams are spatially mapped in step 730 by rotating the space-time streams in the frequency domain. The space-time streams are generally rotated in a manner that varies from subcarrier to subcarrier. In addition, the rotation may be applied to both the data and the preamble portions of the packets in the space-time streams. Finally, in step 740 each of the spatially mapped space-time streams are wirelessly transmitted.

Although a specific architecture has been described in connection with FIG. 6 herein, including specific functional elements and relationships, it is contemplated that the systems and methods herein may be implemented in a variety of ways. For example, functional elements may be packaged together or individually, or may be implemented by fewer, more or different devices, and may be either integrated within other products, or adapted to work with other products externally. When one element is indicated as being responsive to another element, the elements may be directly or indirectly coupled.

The processes described above, including that shown in FIG. 7, may be implemented in a general, multi-purpose or single purpose processor. Such a processor will execute instructions, either at the assembly, compiled or machine-level, to perform that process. Those instructions can be written by one of ordinary skill in the art following the descriptions herein and stored or transmitted on a computer readable medium. The instructions may also be created using source code or any other known computer-aided design tool. A computer readable medium may be any medium capable of carrying those instructions and includes a CD-ROM, DVD, magnetic or other optical disc, tape, silicon memory (e.g., removable, non-removable, volatile or non-volatile), packetized or non-packetized wireline or wireless transmission signals.

A method and apparatus has been described for overcoming degradations to a multicarrier modulated signal being received from one or more individual antennas in a Multiple-Input-Multiple-Output (MIMO) transmitter. This is accomplished by rotating the space-time streams of the signal in the frequency domain. In this way the signal degradations can be overcome without modifying the MIMO receiver.

It will furthermore be apparent that other and further forms of the invention, and embodiments other than the specific embodiments described above, may be devised without departing from the spirit and scope of the appended claims and their equivalents, and it is therefore intended that the scope of this invention will only be governed by the following claims and their equivalents.

The invention claimed is:

1. A method of transmitting a digital signal, comprising:
generating a plurality of spatial streams from a digital signal;
transforming the spatial streams into a plurality of space-time streams;
cycling in a frequency domain each of the space-time streams among each of a plurality of transmit antennas, including a first antenna and a second antenna, so each space-time stream is successively transmitted by each of the transmit antennas, wherein at least two spatial mapping matrices are selected for the cycling, including a first matrix for use with a first subcarrier and a second matrix, which is different from the first matrix, for use with a second subcarrier, the first matrix mapping each space-time stream entirely to the first antenna, and the second matrix mapping each space-time stream entirely to the second antenna; and wirelessly transmitting each of the space-time streams from each of the plurality of transmit antennas.

2. The method of claim 1 wherein cycling in the frequency domain comprises applying a rotation matrix to each of the space-time streams.

3. The method of claim 2 wherein the rotation matrix is applied by spatially mapping the space-time streams.

4. The method of claim 3 wherein the plurality of space-time streams each include data and a preamble for estimating a channel transfer function, and further comprising applying spatial mapping by rotating both the data and the preamble of the space-time streams.

5. The method of claim 2 wherein a number of transmit chains is equal to 3 and rotation of the space-time streams to subcarriers k, k+1 and k+2 is performed by applying spatial mapping matrices $Q_k$, $Q_{k+1}$, and $Q_{k+2}$, respectively, where $$Q_k = \begin{bmatrix} 1 & 0 & 0 \\ 0 & 1 & 0 \\ 0 & 0 & 1 \end{bmatrix}$$

$$Q_{k+1} = \begin{bmatrix} 0 & 0 & 1 \\ 1 & 0 & 0 \\ 0 & 1 & 0 \end{bmatrix}$$

$$Q_{k+2} = \begin{bmatrix} 1 & 0 & 0 \\ 0 & 0 & 1 \\ 0 & 1 & 0 \end{bmatrix}.$$

6. The method of claim 3 wherein the spatial mapping further comprises encoding the space-time streams using space time block coding (STBC).

7. The method of claim 1 wherein the digital signal employs a multicarrier modulation scheme.

8. The method of claim 7 wherein the multicarrier modulated digital signal has a plurality of subcarriers and the space-time streams are rotated in a manner that varies from subcarrier to subcarrier.

9. The method of claim 7 wherein the multicarrier digital signal is an Orthogonal Frequency Division Multiplexing (OFDM) signal.

10. The method of claim 9 wherein the OFDM signal is compatible with at least one IEEE 802.11 standard.

11. A wireless Multiple-Input-Multiple-Output (MIMO) transmitter, comprising:
a stream parser for generating a plurality of spatial streams from a digital signal;
a space time block coder (STBC) for mapping each of the spatial streams to a plurality of space-time streams;
a spatial mapper for spatially expanding each of the space-time streams by rotating the space-time streams in a frequency domain; and
an analog front end for modulating the spatially expanded space-time streams onto a wireless carrier, the analog front end including a plurality of transmit antennas, including a first antenna and a second antenna, and rotation of the space-time streams in the frequency domain including use of a first spatial mapping matrix with a first subcarrier and a second spatial mapping matrix with a second subcarrier, the second matrix being different from the first matrix;

wherein the first matrix maps each space-time stream entirely to the first antenna, and the second matrix maps each space-time stream entirely to the second antenna.

12. The MIMO transmitter of claim 11 wherein the digital signal is an OFDM signal and further comprising a QAM mapping element mapping data bits in the spatial streams to constellation points.

13. The MIMO transmitter of claim 11 wherein the space-time streams are rotated in a manner that varies from subcarrier to subcarrier.

14. The MIMO transmitter of claim 11 wherein a number of transmit chains employed by the analog front end is equal to 3 and rotation of the space-time streams to subcarriers k, k+1 and k+2 is performed by applying spatial mapping matrices $Q_k$, $Q_{k+1}$, and $Q_{k+2}$, respectively, where $$Q_k = \begin{bmatrix} 1 & 0 & 0 \\ 0 & 1 & 0 \\ 0 & 0 & 1 \end{bmatrix}$$

$$Q_{k+1} = \begin{bmatrix} 0 & 0 & 1 \\ 1 & 0 & 0 \\ 0 & 1 & 0 \end{bmatrix}$$

$$Q_{k+2} = \begin{bmatrix} 1 & 0 & 0 \\ 0 & 0 & 1 \\ 0 & 1 & 0 \end{bmatrix}.$$

15. At least one non-transitory computer-readable medium encoded with instructions which, when executed by a processor, performs a method including:
dividing a multicarrier digital signal having a plurality of subcarriers into a plurality of spatial streams;
mapping the spatial streams into a plurality of space-time streams; and
spatially mapping the space time streams by rotating the space-time streams in a frequency domain so each space-time stream is successively transmitted by each of a plurality of transmit antennas, including a first antenna and a second antenna;
wherein at least two spatial mapping matrices are selected for the rotating, including a first matrix for use with a first subcarrier and a second matrix, which is different from the first matrix, for use with a second subcarrier, the first matrix mapping each space-time stream entirely to the first antenna, and the second matrix mapping each space-time stream entirely to the second antenna.

16. The non-transitory computer-readable medium of claim 15 wherein the space-time streams are rotated in a manner that varies from subcarrier to subcarrier.

17. The non-transitory computer-readable medium of claim 15 wherein the plurality of space-time streams each include packets having data and a preamble for estimating a channel transfer function, and further comprising applying spatial mapping by rotating both the data and the preamble of packets in the space-time streams.

18. The non-transitory computer-readable medium of claim 15 wherein a number of transmit chains is equal to 3 and rotation of the space-time streams to subcarriers k, k+1 and k+2 is performed by applying spatial mapping matrices $Q_k$, $Q_{k+1}$, and $Q_{k+2}$, respectively, where $$Q_k = \begin{bmatrix} 1 & 0 & 0 \\ 0 & 1 & 0 \\ 0 & 0 & 1 \end{bmatrix}$$

$$Q_{k+1} = \begin{bmatrix} 0 & 0 & 1 \\ 1 & 0 & 0 \\ 0 & 1 & 0 \end{bmatrix}$$

$$Q_{k+2} = \begin{bmatrix} 1 & 0 & 0 \\ 0 & 0 & 1 \\ 0 & 1 & 0 \end{bmatrix}.$$

19. The non-transitory computer-readable medium of claim 15 wherein the multicarrier digital signal is an Orthogonal Frequency Division Multiplexing (OFDM) signal.

20. The non-transitory computer-readable medium of claim 19 wherein the OFDM signal is compatible with at least one IEEE 802.11 standard.

21. The non-transitory computer-readable medium of claim 15 wherein the spatial mapping further comprises encoding the space-time streams using space time block coding (STBC).

\* \* \* \* \*